(12) United States Patent
Li et al.

(10) Patent No.: US 10,649,161 B2
(45) Date of Patent: May 12, 2020

(54) HERMETIC OPTICAL FIBER ALIGNMENT ASSEMBLY

(71) Applicant: NANOPRECISION PRODUCTS, INC., El Segundo, CA (US)

(72) Inventors: Shuhe Li, Pasadena, CA (US); Robert Ryan Vallance, Newbury Park, CA (US); Michael K. Barnoski, Pacific Palisades, CA (US)

(73) Assignee: CUDOQUANTA FLORIDA, INC., Sarasota, FL (US)

( * ) Notice: Subject to any disclaimer, the term of this patent is extended or adjusted under 35 U.S.C. 154(b) by 0 days.

(21) Appl. No.: 16/037,705

(22) Filed: Jul. 17, 2018

(65) Prior Publication Data
US 2019/0137707 A1    May 9, 2019

Related U.S. Application Data

(63) Continuation of application No. 14/968,841, filed on Dec. 14, 2015, now abandoned, which is a (Continued)

(51) Int. Cl.
G02B 6/42 (2006.01)
G02B 6/36 (2006.01)
G02B 6/38 (2006.01)

(52) U.S. Cl.
CPC ......... *G02B 6/4248* (2013.01); *G02B 6/3636* (2013.01); *G02B 6/3838* (2013.01);
(Continued)

(58) Field of Classification Search
CPC .................................................. G02B 6/4248
See application file for complete search history.

(56) References Cited

U.S. PATENT DOCUMENTS

| 5,671,315 A * | 9/1997 | Tabuchi ............... G02B 6/4208 385/137 |
| 2003/0142920 A1 | 7/2003 | Dallas et al. |
| 2007/0172175 A1 | 7/2007 | Imanbayev et al. |

FOREIGN PATENT DOCUMENTS

| EP | 1308760 | 5/2003 |
| EP | 1336882 | 8/2003 |

* cited by examiner

*Primary Examiner* — Peter Radkowski
(74) *Attorney, Agent, or Firm* — Liu & Liu (57) ABSTRACT

A hermetic optical fiber alignment assembly, including a first ferrule portion having a first surface provided with a plurality of grooves receiving the end sections of optical fibers, wherein the grooves define the location and orientation of the end sections with respect to the first ferrule portion, and a second ferrule portion having a second surface facing the first surface of the first ferrule, wherein the first ferrule portion is attached to the second ferrule portion with the first surface against the second surface, wherein a cavity is defined between the first ferrule portion and the second ferrule portion, wherein the cavity is wider than the grooves, and wherein a suspended section of each optical fiber is suspended in the cavity, and wherein the cavity is sealed with a sealant. The sealant extends around the suspended sections of the optical fibers within the cavity. An aperture is provided in at least one of the first ferrule portion and the second ferrule portion, exposing the cavity, wherein the sealant is feed through the aperture. In another aspect, the hermetic assembly provides optical alignment and a hermetic feedthrough for an opto-electronic module. In a further aspect, the hermetic assembly provides alignment and a terminal for access to an opto-electronic module.

14 Claims, 12 Drawing Sheets

Related U.S. Application Data continuation of application No. 13/861,268, filed on Apr. 11, 2013, now Pat. No. 9,213,148.

(60) Provisional application No. 61/623,027, filed on Apr. 11, 2012, provisional application No. 61/699,125, filed on Sep. 10, 2012.

(52) U.S. Cl.
CPC ......... *G02B 6/3839* (2013.01); *G02B 6/3861* (2013.01); *G02B 6/3885* (2013.01); *G02B 6/4214* (2013.01); *G02B 6/4219* (2013.01); *G02B 6/4253* (2013.01); *G02B 6/4292* (2013.01); *Y10T 29/4998* (2015.01)

HERMETIC OPTICAL FIBER ALIGNMENT ASSEMBLY

PRIORITY CLAIM

This application is a continuation of U.S. patent application Ser. No. 14/968,841 filed on Dec. 14, 2015, which is a continuation of U.S. patent application Ser. No. 13/861,268 filed on Apr. 11, 2013, now U.S. Pat. No. 9,213,148, which claims the priority of U.S. Provisional Patent Application No. 61/623,027 filed on Apr. 11, 2012, and U.S. Provisional Patent Application No. 61/699,125 filed on Sep. 10, 2012, which are fully incorporated by reference as if fully set forth herein. All publications noted below are fully incorporated by reference as if fully set forth herein.

GOVERNMENT RIGHTS

This invention was made with government support under Contract No. N68335-12-C-0123 awarded by NAVAL AIR WARFARE CTR AIRCRAFT DIVISION. The government has certain rights in the invention.

BACKGROUND OF THE INVENTION

Field of the Invention

The present invention relates to optical fiber ferrule structures, in particular a hermetic optical fiber alignment assembly including a ferrule for aligning optical fibers.

Description of Related Art

Given the increasing bandwidth requirements for modern day data transmission (e.g., for high definition video data), fiber optic signal transmissions have become ubiquitous for communicating data. Optical signals are transmitted over optical fibers, through a network of optical fibers and associated connectors and switches. The optical fibers demonstrate a significantly higher bandwidth data transmission capacity and lower signal losses compared to copper wires for a given physical size/space.

In fiber optic signal transmission, conversions between optical signals and electrical signals take place beyond the terminating end of the optical fiber. Specifically, at the output end of an optical fiber, light from the optical fiber is detected by a transducing receiver and converted into an electrical signal for further data processing downstream (i.e., optical-to-electrical conversion). At the input end of the optical fiber, electrical signals are converted into light to be input into the optical fiber by a transducing transmitter (i.e., electrical-to-optical conversion).

The opto-electronic devices (receiver and transmitter and associated optical elements and electronic hardware) are contained in an opto-electronic module or package. The optical fiber is introduced from outside the housing of the opto-electronic module, through an opening provided in the housing wall. The end of the optical fiber is optically coupled to the opto-electronic devices held within the housing. A feedthrough element supports the portion of the optical fiber through the wall opening. For a variety of applications, it is desirable to hermetically seal the opto-electronic devices within the housing of the opto-electronic module, to protect the components from corrosive media, moisture and the like. Since the package of the opto-electronic module must be hermetically sealed as whole, the feedthrough element must be hermetically sealed, so that the electro-optic components within the opto-electronic module housing are reliably and continuously protected from the environment.

Heretofore, hermetic feedthrough is in the form of a cylindrical sleeve defining a large clearance through which a section of the optical fiber passes. The optical fiber extends beyond the sleeve into the opto-electronic module. The end of the optical fiber is terminated in a ferrule (separate from the sleeve) that is aligned with the opto-electronic devices provided therein. A sealing material such as epoxy is applied to seal the clearance space between the optical fiber and inside wall of the sleeve. The sleeve is inserted into the opening in the opto-electronic module housing, and the opening is sealed, typically by soldering the exterior wall of the sleeve to the housing. The outside wall of the sleeve may be gold plated to facilitate soldering and improve corrosion resistance.

Given the large clearance between the sleeve and the optical fiber and the use of epoxy to seal such clearance (i.e., a layer of epoxy between the external fiber wall and the inside wall of the sleeve), the sleeve does not support the optical fiber with any positional alignment with respect to the sleeve. Given the sealing material provides stress and strain relief for the section of optical fiber held therein, the brittle fiber does not easily break during handling. The sleeve essentially functions as a grommet or conduit that is sealed to the opto-electronic module housing and that allows the optical fiber to pass through in a hermetic seal within the sleeve. As noted below, the end of the optical fiber needs to be aligned to the opto-electronic devices to within acceptable tolerances by means of a ferrule.

To optically couple the input/output of the optical fiber to the opto-electronic devices in the opto-electronic module, optical elements such as lenses and mirrors are required to collimate and/or focus light from a light source (e.g., a laser) into the input end of the optical fiber, and to collimate and/or focus light from the output end of the optical fiber to the receiver. To achieve acceptable signal levels, the end of the optical fiber must be precisely aligned at high tolerance to the transmitters and receivers, so the optical fiber are precisely aligned to the optical elements supported with respect to the transmitters and receivers. In the past, given the internal optical elements and structures needed to achieve the required optical alignments at acceptable tolerance, coupling structures including a connection port is provided within the hermetically sealed opto-electronic module housing to which a ferrule terminating the end of the optical fiber is coupled. The transmitters and receivers and associated optical elements and connection structures are therefore generally bulky, which take up significant space, thereby making them not suitable for use in smaller electronic devices. Heretofore, opto-electronic modules containing transmitters and receivers are generally quite expensive and comparatively large in size for a given port count. Given optical fibers are brittle, and must be handled with care during and after physical connection to the coupling structure within the opto-electronic module and to avoid breakage at the feedthrough sleeve. In the event of breakage of the optical fiber, it has been the industry practice to replace the entire opto-electronic module to which the hermetic optical fiber feedthrough is soldered. The connection and optical alignment of the optical fibers with respect to the transmitters and receivers must be assembled and the components must be fabricated with sub-micron precision, and should be able to be economical produced in a fully automated, high-speed process.

The above noted drawbacks of existing fiber optic data transmission are exacerbated in multi-channel fiber transmission.

OZ Optics Ltd produces multi-fiber hermetically sealable patchcord with glass solder having multiple optical fibers passing through a sleeve, with the optical fibers extending beyond the sleeve, with the ends of the optical fibers held in an alignment ferrule separate from the sleeve. OZ Optics Ltd further produces a multi-fiber hermetically sealable patchcord with metal solder, in which the optical fibers are coated with a metal (metalized fibers). The optical fibers are terminated with a silicon ferrule that is supported within a sleeve, which is a component separate from the ferrule. The outside wall of the sleeve is gold plated for sealing to an opto-electronic module housing. However, these multi-fiber hermetic feedthrough configurations do not appear to resolve the drawbacks of the prior art noted above, and introduce additional complexity and cost at least from a manufacturability perspective.

What is needed is an improved hermetic optical fiber alignment assembly, which improves optical alignment, manufacturability, ease of use, functionality and reliability at reduced costs.

SUMMARY OF THE INVENTION

The present invention provides an improved hermetic optical fiber alignment assembly, which improves optical alignment, manufacturability, ease of use, functionality and reliability at reduced costs, thereby overcoming many of the drawbacks of the prior art structures.

In one aspect, the present invention provides a hermetic optical fiber alignment assembly, comprising: a first ferrule portion having a first surface provided with a plurality of grooves receiving at least the end sections of a plurality of optical fibers, wherein the grooves define the location and orientation of the end sections with respect to the first ferrule portion; a second ferrule portion having a second surface facing the first surface of the first ferrule, wherein the first ferrule portion is attached to the second ferrule portion with the first surface against the second surface, wherein a cavity is defined between the first ferrule portion and the second ferrule portion, wherein the cavity is wider than the grooves, and wherein a suspended section of each optical fiber is suspended in the cavity, and wherein the cavity is sealed with a sealant. The sealant extends around the suspended sections of the optical fibers within the cavity. At least one the first surface of the first ferrule portion is provided with a well defining a first pocket in the first ferrule portion, wherein the first pocket and the second ferrule section together define the cavity. An aperture is provided in at least one of the first ferrule portion and the second ferrule portion, exposing the cavity, wherein the sealant is feed through the aperture.

In another aspect of the present invention, the hermetic optical fiber alignment assembly provides optical alignment and a hermetic feedthrough for an opto-electronic module. In a further aspect of the present invention, the hermetic optical fiber alignment assembly provides alignment and a terminal for access to an opto-electronic module.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention provides an improved hermetic optical fiber assembly, which improves optical alignment, manufacturability, ease of use, functionality and reliability at reduced costs, thereby overcoming many of the drawbacks of the prior art structures.

Figure 1:
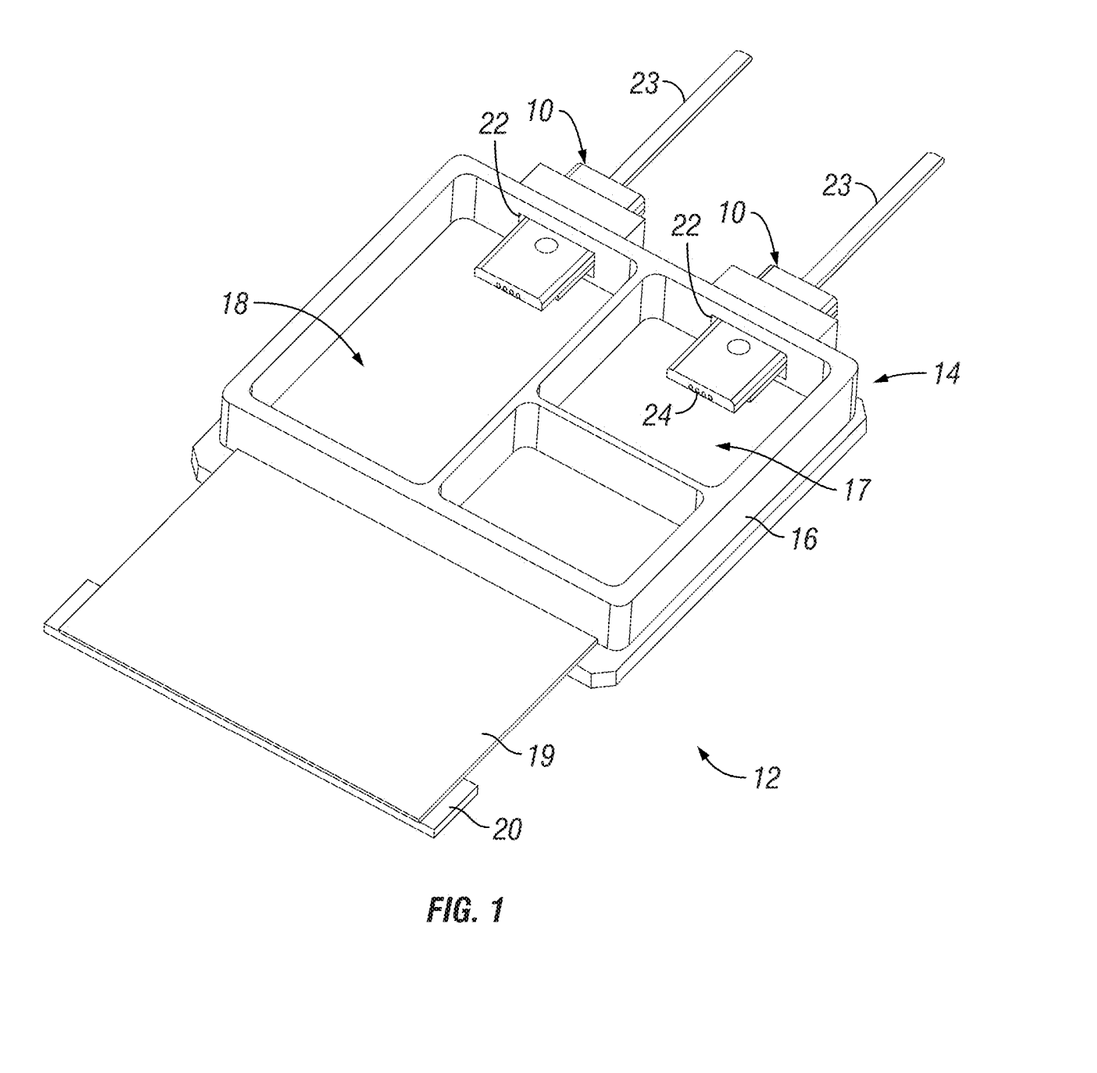
FIG. 1 is a schematic perspective view of an opto-electronic module housing, to which hermetic optical fiber assemblies are hermetically sealed, in accordance with one embodiment of the present invention.

FIG. 1 is a schematic diagram of an opto-electronic module 12, to which hermetic optical fiber assemblies 10 are hermetically sealed, in accordance with one embodiment of the present invention. The opto-electronic module 12 includes a housing 14, which includes a base 16 and a cover hermetically sealed to the housing, protecting the interior of the housing from the environment external of the housing.

For simplicity, the cover of the opto-electronic module 12 is omitted in FIG. 1. Enclosed within chambers in the housing are opto-electronic devices 17 and 18 (e.g., transmitter and receiver and associated electronics and/or optical elements (not specifically shown in FIG. 1, but schematically shown in FIG. 3). The electronics within the opto-electronic module 12 are electrically coupled to an external circuit board 20 via flexible electrical connection pins 19.

In the illustrated embodiment, the housing base 16 includes two openings 21 and 22 through which the hermetic optical fiber assemblies 10 are inserted. In accordance with one aspect of the present invention, each hermetic optical fiber assembly 10 serves as a hermetic feedthrough for optical fibers 24 in a fiber ribbon 23. In the illustrated embodiment, there are four optical fibers 24 in the fiber ribbon 23. The hermetic optical fiber assembly 10 also serves as a ferrule, which supports the ends (i.e., a section or "end section") of the optical fibers 24 in a fixed position with respect to each other and with respect to the external surfaces of the hermetic optical fiber assembly 10. As will be elaborated further below, once the hermetic optical fiber assembly 10 is fixed attached to the housing 14 (e.g., by soldering at the opening (21, 22) in base 16), the ends of the optical fibers 24 would be fixed in position (i.e., precisely aligned) with respect to the opto-electronic devices (17, 18) in the housing 14.

Figure 2:
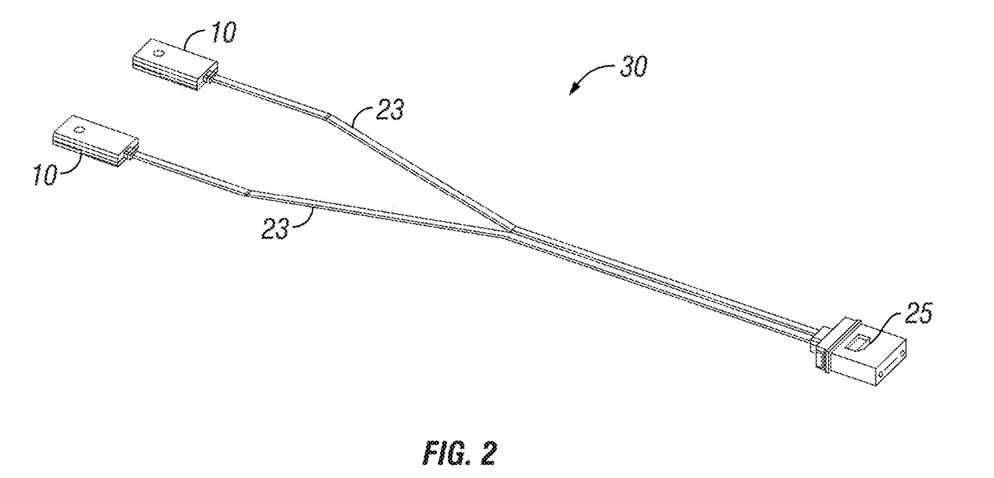
FIG. 2 is a schematic perspective view illustrating an optical jump patchcord having hermetic optical fiber assemblies, in accordance with one embodiment of the present invention.
Figure 3:
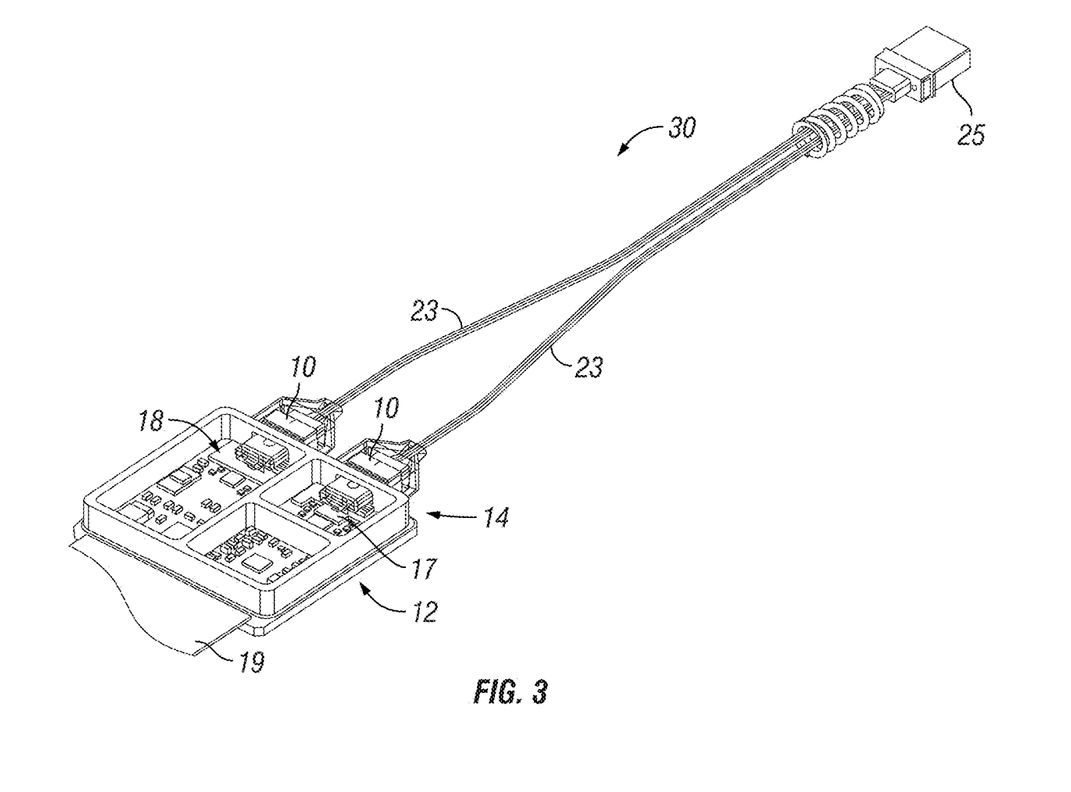
FIG. 3 is a schematic diagram illustrating the optical jump patchcord in FIG. 2 with the hermetic optical fiber assembly hermetically sealed to an opto-electronic module housing, in accordance with one embodiment of the present invention.

FIG. 2 is a schematic diagram illustrating an optical jump patchcord 30 having hermetic optical fiber assemblies 10, in accordance with one embodiment of the present invention. FIG. 3 is a schematic diagram illustrating the optical jump patchcord 30 with the hermetic optical fiber assemblies 10 hermetically sealed to an opto-electronic module housing, in accordance with one embodiment of the present invention. In the illustrated embodiment, the optical jump patchcord 30 includes two fiber ribbons 23, each terminating at one end with a hermetic optical fiber assembly 10, and commonly terminating at another end with a connector 25 for coupling to a fiber network. The connector 25 and the opto-electronic module 12 may be part of an opto-electronic peripheral board, comprising a circuit board (not shown) that supports the opto-electronic module 12 and the connector 25 at an edge of the circuit board. In which case, the optical jump patchcord 30 serves as a short optical fiber connection from the opto-electronic module 12 to a built-in terminal (i.e., the connector 25) of the opto-electronic peripheral board for external connection to the fiber network or backplane printed circuit board.

FIGS. 4 to 9 illustrate the detail structures of the hermetic optical fiber assembly 10, in accordance with one embodiment of the present invention. The hermetic optical fiber assembly 10 is essentially a ferrule assembly, having parallel open grooves provided therein for aligning the ends of the optical fibers 24.

Figure 4A:
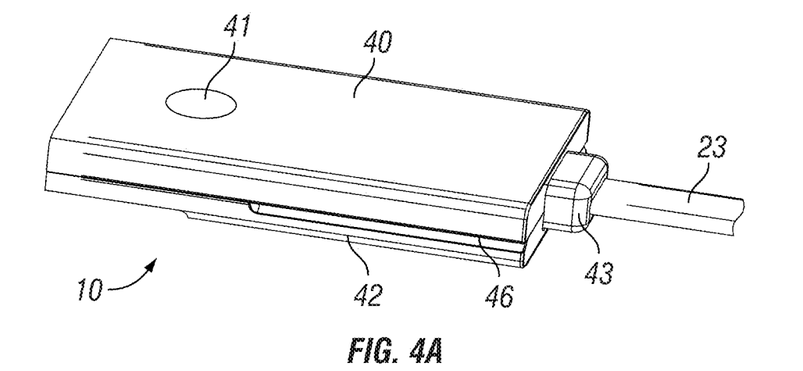
FIGS. 4A to 4C are perspective views of the hermetic optical fiber assembly, in accordance with one embodiment of the present invention.
Figure 4B:
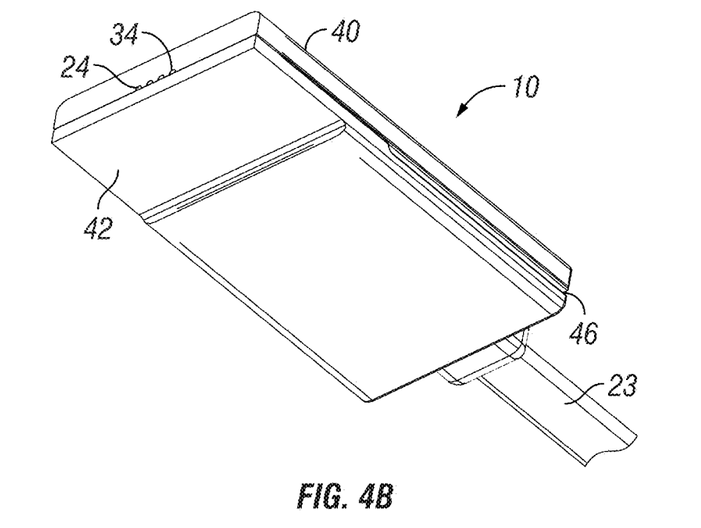
Figure 4C:
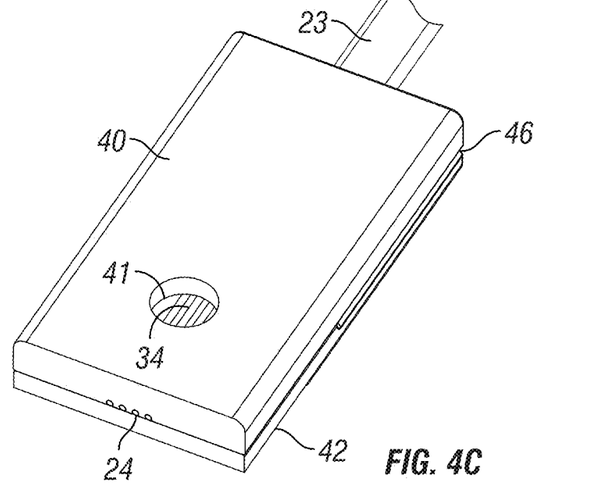
Figure 5A:
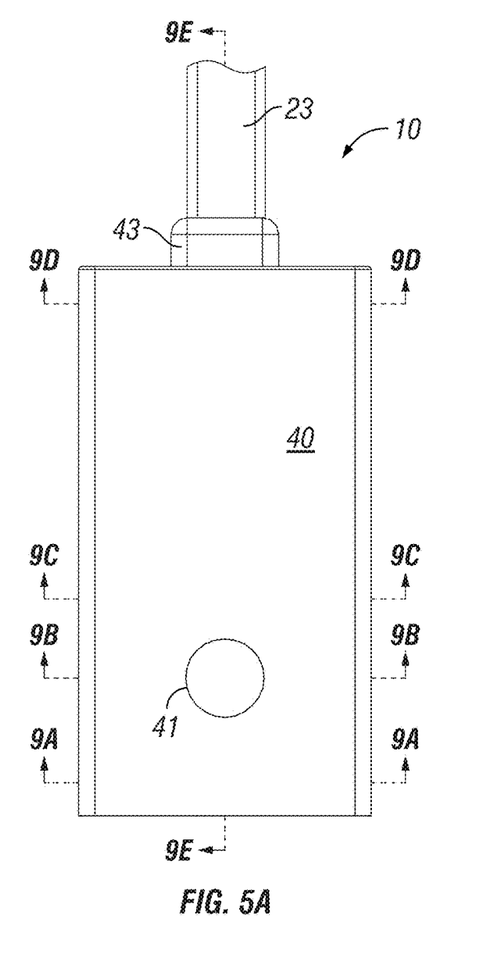
FIGS. 5A to 5C are plan views of the hermetic optical fiber assembly in FIG. 4.
Figure 5B:
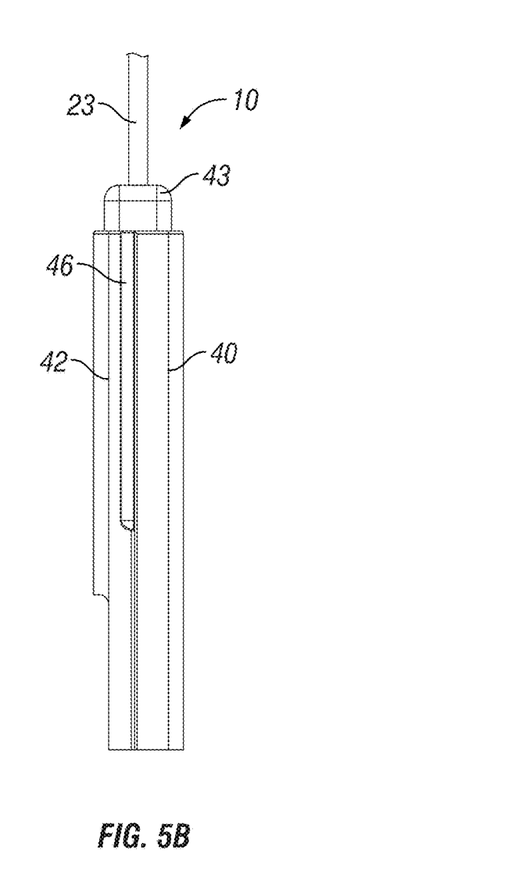
Figure 5C:
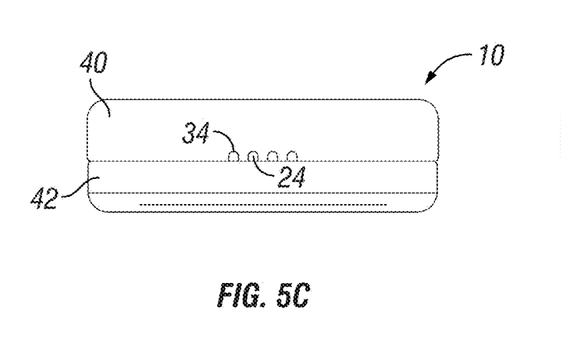
Figure 6:
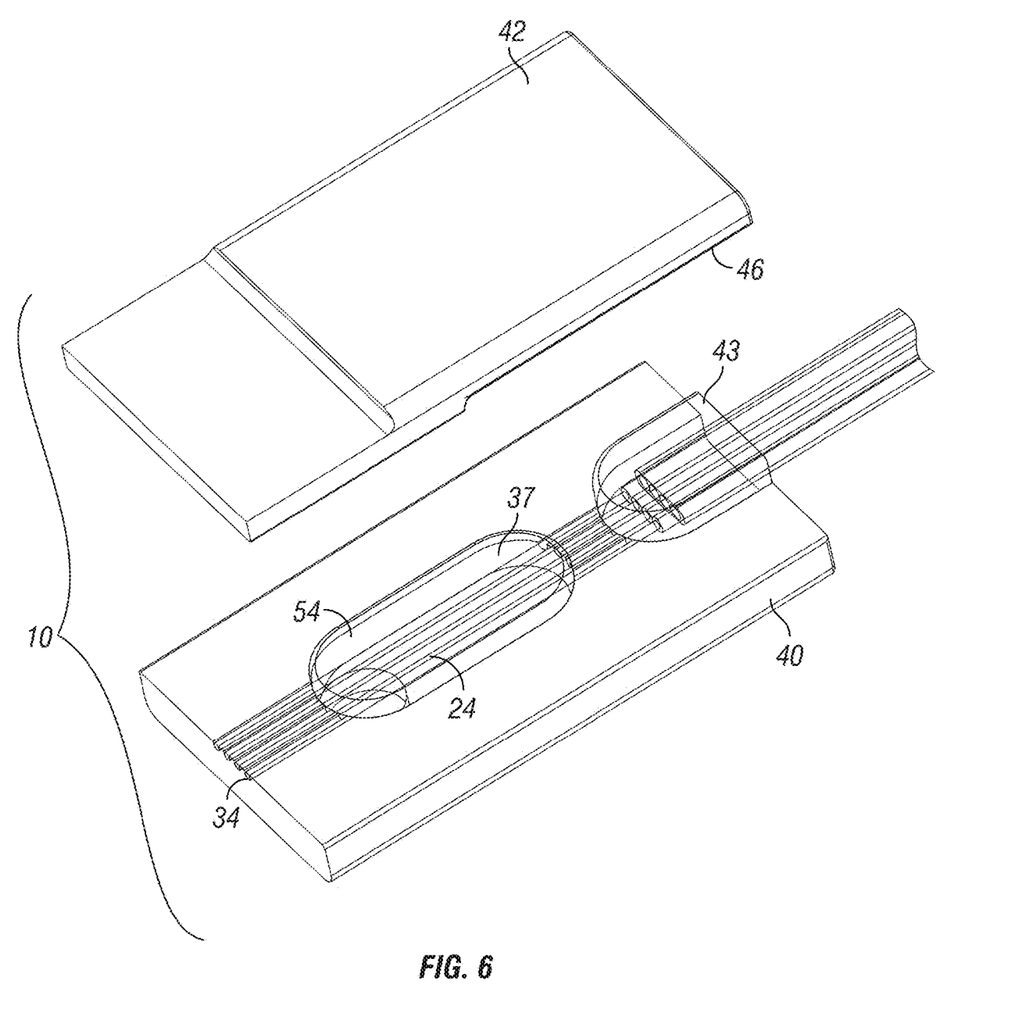
FIG. 6 is an exploded perspective view of the hermetic optical fiber assembly in FIG. 4, in accordance with one embodiment of the present invention.

FIGS. 4A to 4C are perspective views of the hermetic optical fiber assembly 10. FIGS. 5A to 5C are plan views of the hermetic optical fiber assembly 10. FIG. 6 is an exploded perspective view of the hermetic optical fiber assembly 10. FIGS. 9A to 9E are sectional views taken along lines 9A-9A to 9E-9E in FIG. 5A. In the illustrated embodiment, the ferrule assembly 10 comprises two ferrule portions, of which a first ferrule portion (hereinafter referred to as a ferrule 40) is provided with optical fiber alignment grooves 34 and a second ferrule portion (hereinafter referred to as a cover 42) is not provided with any alignment grooves. The ferrule portions each have a generally planar structure (as compared to a tube or sleeve).

Figure 7A:
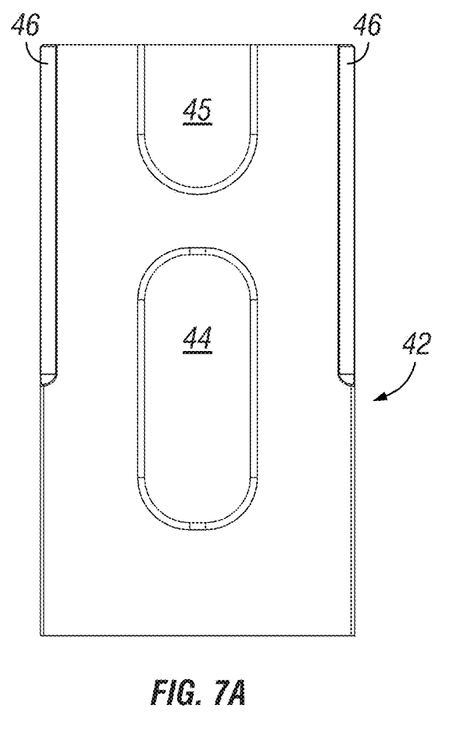
FIGS. 7A to 7E are plan views of the cover of the hermetic optical fiber assembly.
Figure 7B:
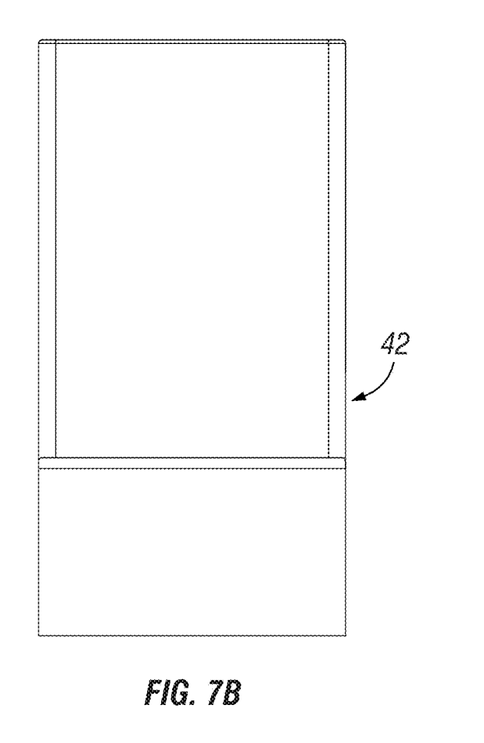
Figure 7C:
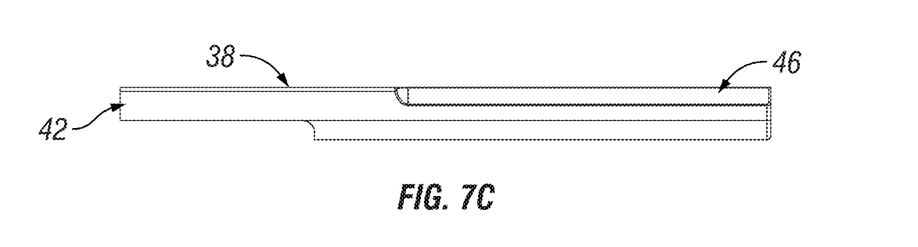
Figure 7D:
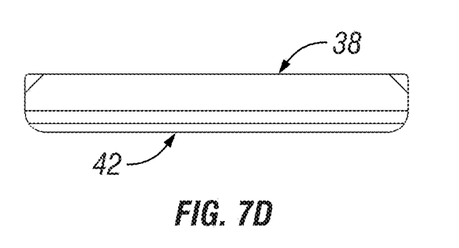
Figure 7E:
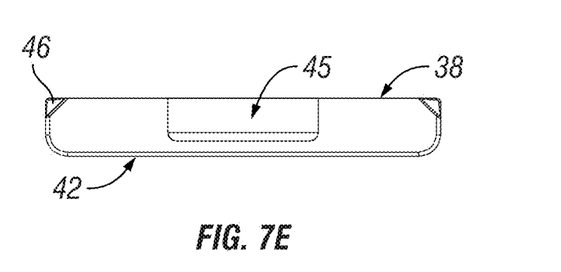

FIGS. 7A to 7E are plan views of the cover 42 of the hermetic optical fiber assembly 10. Referring to FIG. 7A, the underside 38 of the cover 42 (the side facing the ferrule 40) is provided with a shallow well forming a pocket 44 near the center and a cutout 45 at one longitudinal end of the cover 42. Chamfers 46 are provided on the longitudinal edges.

Figure 8A:
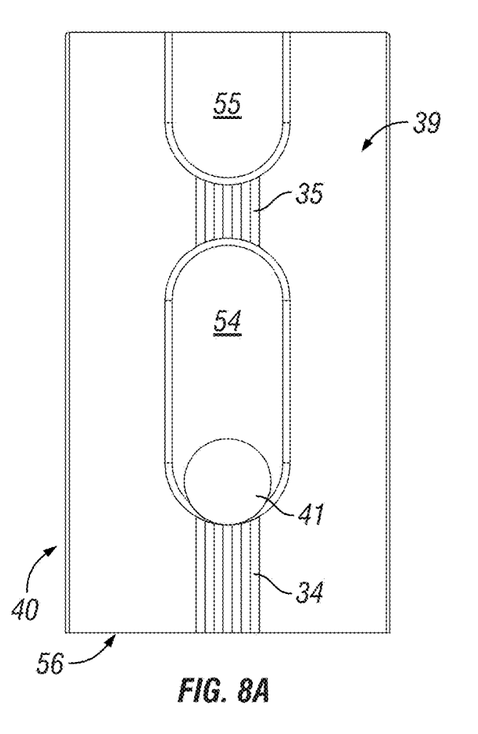
FIGS. 8A to 8E are plan views of the ferrule of the hermetic optical fiber assembly.
Figure 8B:
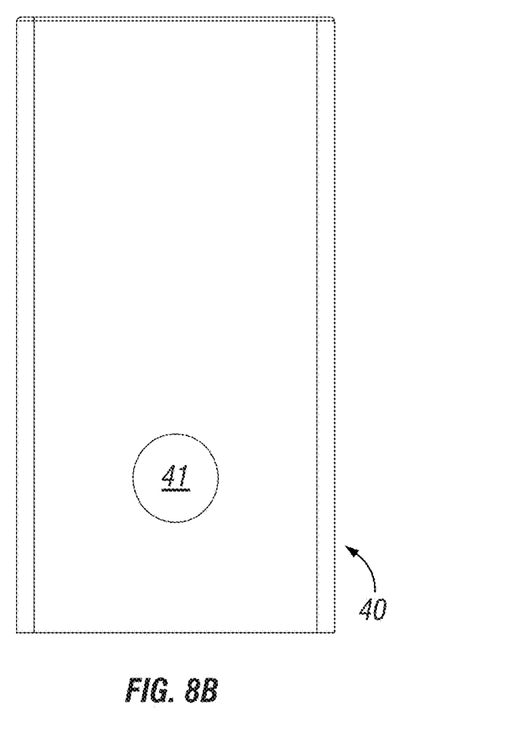
Figure 8C:
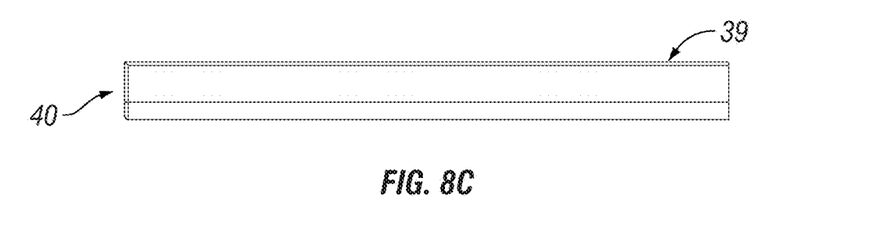

FIGS. 8A to 8E are plan views of the ferrule 40 of the hermetic optical fiber assembly 10. Referring to FIG. 8A, the underside 39 of the ferrule 40 (the side facing the cover 42) is provided with a shallow well forming a pocket 54 near the center and a cutout 55 at one longitudinal end of the ferrule 40, matching the pocket 44 and cutout 45. Parallel longitudinal grooves 34 in a horizontal plane parallel to the underside 39 are provided between the end face 56 and the pocket 54. Additional parallel longitudinal grooves 35 in a horizontal plane parallel to the underside 39 are provided between the pocket 54 and cutout 55. Referring also to FIG. 9E, the grooves 34 and 35 are sized to receive the terminating end sections of each optical fiber 24 (i.e., a short section of each optical fiber bear an end, in its bare state exposing the cladding layer, with protective buffer layer and jacket removed). Specifically, the grooves 34 are precisely sized to precisely position the ends of optical fibers 24 in relation to one another and the external surfaces of the ferrule 40. Upon attaching the hermetic optical fiber assembly 10 to the housing 14 (e.g., by soldering at the opening (21, 22) in base 16), the ends of the optical fibers 24 would be fixed in position (i.e., precisely aligned) with respect to the opto-electronic devices (17, 18) in the housing 14.

As more clearly shown in FIG. 9E, when the cover 42 and the ferrule 40 are mated together with the underside 38 of cover 42 and underside 39 of ferrule 40 against each other, the pockets 44 and 45 together define a cavity 48 through which a section of each optical fiber 24 is suspended (i.e., not touching the ferrule 40 and the cover 42. The ferrule 40 is provided with an aperture 41, through which sealant can be feed into the cavity 48. Referring also to FIG. 9B, the width of the aperture 41 is substantially wider than the diameter of an optical fiber 24, and extends across the ferrule to expose all the optical fibers 24 arranged in parallel (see FIG. 4C; i.e., the width of the aperture 41 is wider than all the grooves 34 combined in the plane of the ferrule 40). Further, the cutouts 45 and 55 together form a pocket 49 that receives a strain relief 43, which supports the fiber ribbon 24 (including protective layers over the bare optical fibers 24) at the other end of the assembly 10.

Figure 8D:
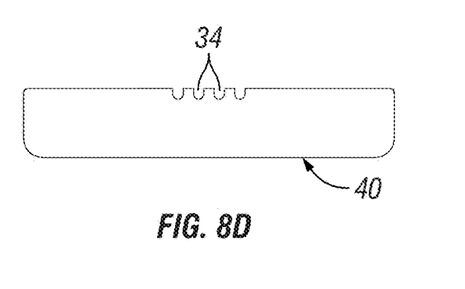
Figure 8E:
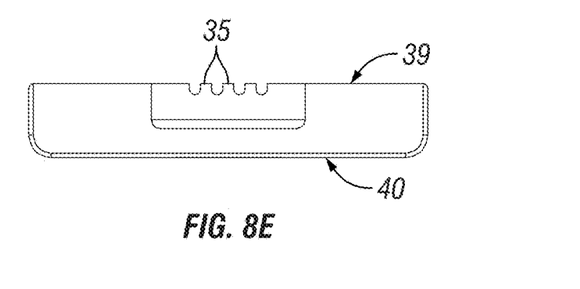
Figure 9A:
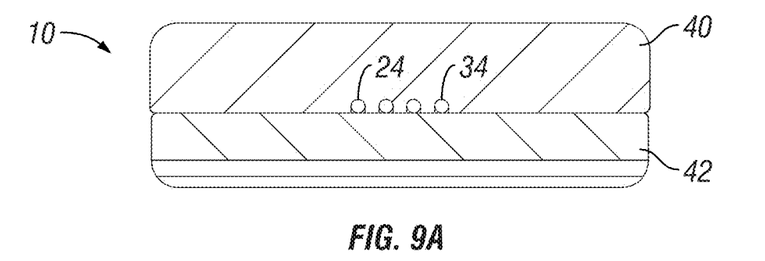
FIGS. 9A to 9E are sectional views taken along lines 9A-9A to 9E-9E in FIG. 5A.
Figure 9B:
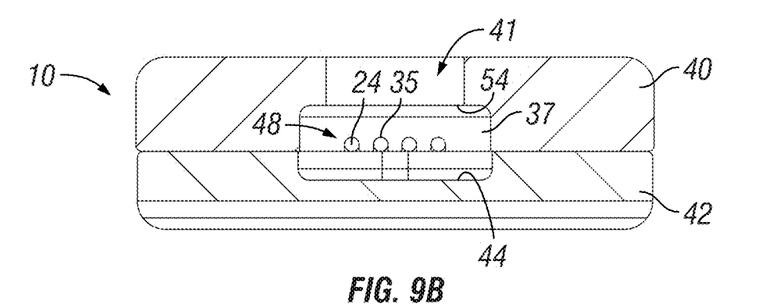
Figure 9C:
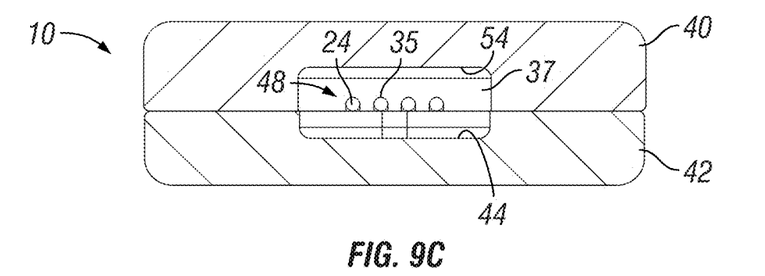
Figure 9D:
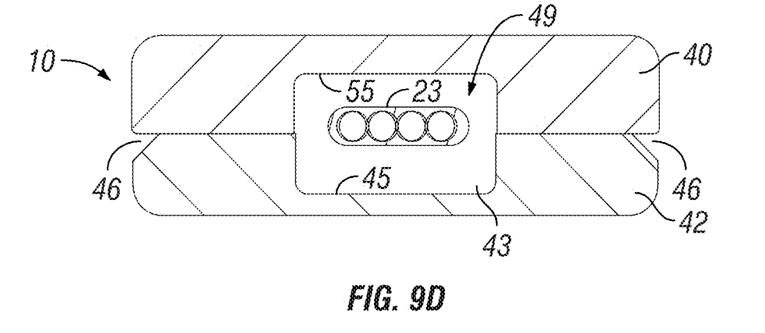
Figures 9E, 10C:
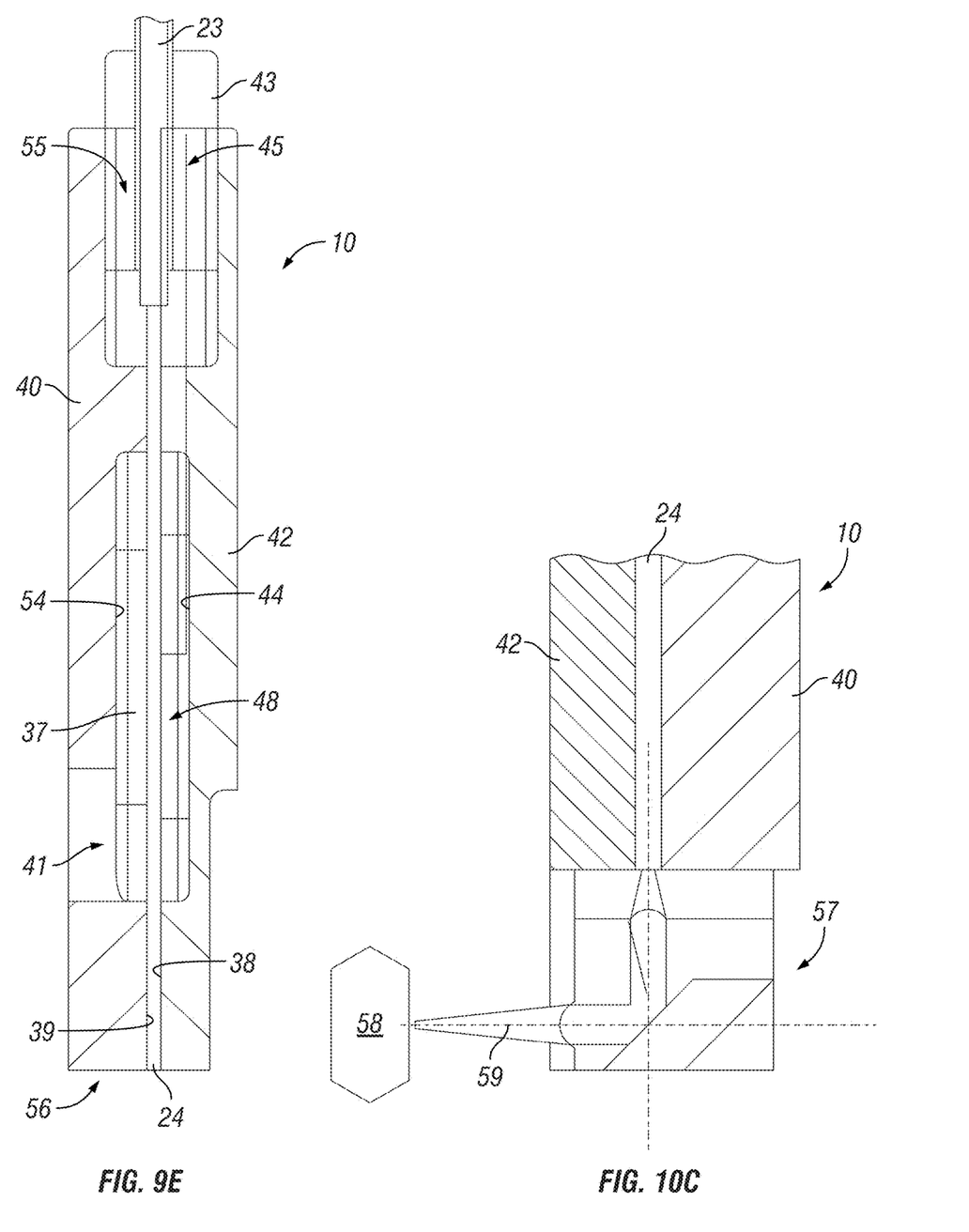
FIG. 10C is a sectional view taken along line 10C-10C in FIG. 10B.

Referring to FIGS. 8D and 9A, the walls of the grooves 34 define a generally U-shaped cross-section. The depth of each groove 34 is sized to completely retain an optical fiber without protruding above the groove 34, with the top of the optical fiber substantially in line with the top of the groove (i.e., at substantially the same level as the surface of the underside 39). When the cover 42 and the ferrule 40 are mated together with the underside 38 of cover 42 and underside 39 of ferrule 40 against each other, the underside 38 of cover 42 just touches the top wall of the optical fibers as it covers over the grooves 34, thus retaining the optical fibers 24 in the grooves 34.

The grooves 34 are structured to securely retain the optical fibers 24 (bare section with cladding exposed, without protective buffer and jacket layers) by clamping the optical fibers 24, e.g., by a mechanical or interference fit (or press fit). For example, the width of the grooves 34 may be sized slightly smaller than the diameter of the optical fibers 24, so that the optical fibers 24 are snuggly held in the grooves 34 by an interference fit. The interference fit assures that the optical fibers 24 is clamped in place and consequently the position and orientation of the ends of the optical fibers 24 are set by the location and longitudinal axis of the grooves 34. In the illustrated embodiment, the grooves 34 has a U-shaped cross-section that snuggly receive the bare optical fibers 24 (i.e., with the cladding exposed, without the protective buffer and jacket layers). The sidewalls of the groove 34 are substantially parallel, wherein the opening of the grooves may be slightly narrower than the parallel spacing between the sidewalls (i.e., with a slight C-shaped cross-section) to provide additional mechanical or interference fit for the optical fibers 24. Further details of the open groove structure can be found in copending U.S. patent application Ser. No. 13/440,970 filed on Apr. 5, 2012, which is fully incorporated by reference herein. The ferrule 40 having the grooves 34 is effectively a one-piece open ferrule supporting the optical fibers 24 with their ends in precise location and alignment with respect to each other and to the external geometry of the ferrule 40.

The grooves 34 may be provided with a rounded bottom in cross-section (see, FIG. 9A), which would conformally contact as much as half the cylindrical wall (i.e., semi-circular cylindrical wall) of the optical fibers. In any event, the wall of the optical fibers 24 would come into contact (e.g., compressive contact) with at least the side walls of the grooves 34, with at least the lateral sides of the optical fibers in tight contact (e.g., substantially tangential contact in cross-section) with the side walls of the grooves 34. Such lateral contact between the optical fibers and adjacent sidewalls of the grooves 34 ensures a geometry that defines the necessary horizontal alignment positioning/spacing of the optical fibers 24 with respect to each other and with respect to at least the lateral sides of the ferrule 40. The precise sizing of the depth of the grooves 34 in the ferrule 40 ensures a geometry in reference to the cover 42 that defines the necessary vertical alignment positioning of the optical fibers 24 with respect to at least the external surface (top surface opposite to the underside 39) of the ferrule 40.

Concerning the grooves 35 for retaining the section of the optical fibers 24 further away from the ends of the optical fibers 24 on the other side of the cavity 48, they may have similar geometries and/or design considerations as the grooves 34. However, it is noted that for purpose of optical alignment of the optical fibers, it is only necessary to provide alignment grooves 34 having tight tolerance for supporting the terminating end section of the optical fibers 24. The grooves 35 provided nearer to the strain relief 43 need not have as strict a tolerance compared to that of the grooves 34, as the tolerance of the grooves would have no bearing on the optical alignment of the ends of the optical fiber 24 with respect to an external optical component.

The hermetic sealing of the assembly 10 can be implemented by the following procedure, in accordance with one embodiment of the present invention. With the protective buffer and jacket layers removed at the end section, the optical fibers 24 is positioned into the grooves 34 and 35 in the ferrule 40. The cover 42 is mated against the ferrule (e.g., by an external clamping fixture) in the configuration illustrated generally by FIG. 9E. The cover 42 and ferrule 40 are soldered together using gold-tin solder. The chamfer 46 provides some clearance to allow bleeding of excess solder. It is noted that the chamfer 46 is shown not to extend along the entire length of the cover 42, to reduce potential clearance to facilitate soldering between the assembly 10 and the module housing 14.

Figure 13:
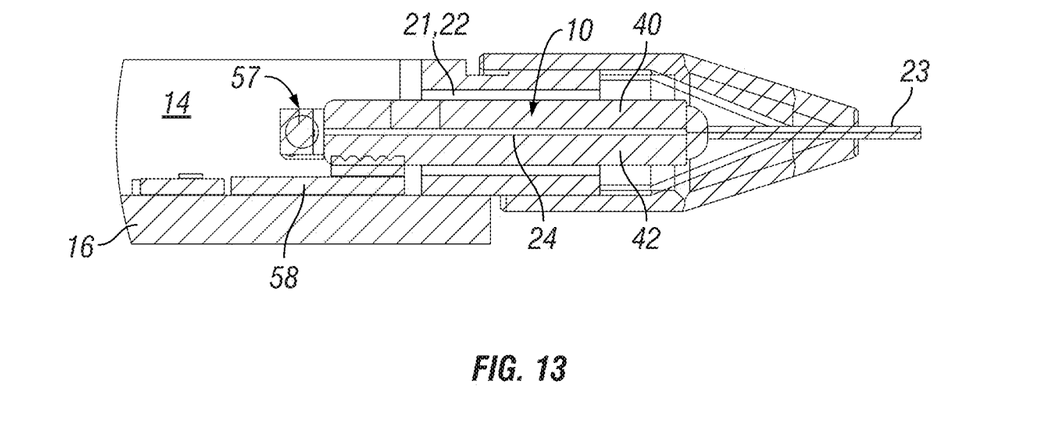
FIG. 13 is a sectional view showing addition detail of the mounting of the hermetic optical fiber assembly to the opto-electronic module housing, in accordance with another embodiment of the present invention.

Referring also to FIG. 13, a sealant 37 such as glass solder (or other sealant suitable for hermetic sealing) is feed through the aperture 41 in the ferrule 40 as vacuum is applied to the pocket 49, thus drawing glass solder to fill the cavity 48 and available spaces/clearance between the optical fibers 23, the grooves 35 and the cover 42, given the grooves are generally U-shaped in cross-section. (See FIG. 13). Some of the glass solder also flows to fill available spaces between the optical fibers, alignment grooves 34 and the cover 42. It is not necessary to draw glass solder completely through the grooves 34 or 35, as long as there is sufficient sealant drawn to a sufficient distance to plug available spaces at least at a region near the entry from the cavity into the respective grooves. Given the pockets 44 and 54 have depths deeper than the depths of the grooves 34 and 35, the sealant wraps around the sections of the optical fiber 24 suspended in the cavity 48. The sealant essentially forms a hermetic plug in the cavity 48, restricting leakage through the assembly 10. The structure of the assembly 10 can be hermetically sealed without requiring any external sleeve, beyond the two ferrule portions (ferrule 40 and cover 42 in the above described embodiment). The structure of the hermetic assembly is thus very simple, which provides an effective hermetic seal.

It is noted that given the tight contact between the wall of the optical fibers and the walls of at least the grooves 34, the sealant does not come between the contact surfaces between the optical fibers 24, the cover 42 and the walls of groove 34 which were present prior to applying the sealant. It is intended that the sealant plugs available spaces and/or clearance between the optical fibers 24, grooves 34 and cover 42, but do not form an intermediate layer between the optical fibers and the groove walls at the contact points prior to applying the sealant, which could otherwise affect the alignment of the optical fibers by the grooves 34.

After sealing with the glass solder, an epoxy material is applied into the pocket 49 to form the strain relief 43. The exposed ends of the optical fiber 24 may be polished to be substantially coplanar with the end face 56 of the ferrule 40 to finish the hermetic assembly 10. The ends of the fibers 24 may protrude slightly (by at most a few microns) beyond the end face 56 of the ferrule 40 but do not extend appreciably beyond the end face 56 because there is no protective buffer and jacket layers at the respective ends of the optical fibers 24. To facilitate soldering of the assembly to the module housing 14 and to improve corrosion resistance, the surfaces of the cover 42 and/or the ferrule 40 may be gold plated.

According to one aspect of the present invention, the ferrule 40 and/or the cover 42 may be formed by precision stamping a metal material. In one embodiment, the metal material may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass). Alternatively, the material may be silicon, a hard plastic or other hard polymeric material.

The above disclosed open structure of the ferrule 40 and cover 42 lends themself to mass production processes such as stamping, which are low cost, high throughput processes. A precision stamping process and apparatus has been disclosed in U.S. Pat. No. 7,343,770, which was commonly assigned to the assignee of the present invention. This patent is fully incorporated by reference as if fully set forth herein. The process and stamping apparatus disclosed therein may be adapted to precision stamping the features of the ferrule 40 and cover 42 of the present invention. The stamping process and system can produce parts with a tolerance of at least 1000 nm.

Figure 5D:
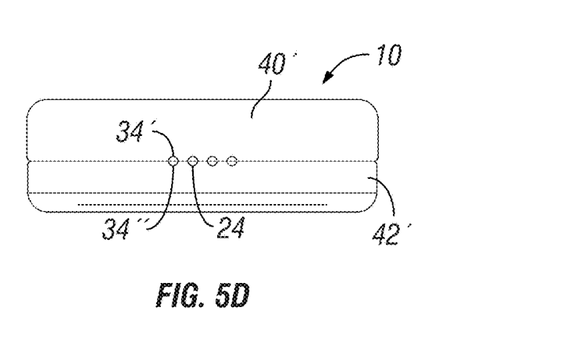
FIG. 5D illustrates an alternate embodiment.

FIG. 5D illustrates an alternate embodiment, in which complementary alignment grooves 34' and 34" (e.g., grooves having C-shaped or semi-circular cross-section) are provided on the ferrule portions 40' and 42', respectively. The grooves 34' and 34" may be symmetrical or asymmetrical with respect to the contact interface between the ferrule portions 40' and 42" in the end view of FIG. 5D (or sectional view orthogonal to the longitudinal axis of the grooves). The ferrule portions 40' and 42" may be identical in an alternate embodiment. Alternatively, grooves having V-shaped cross-section could be used instead of U-shaped or C-shaped grooves in the ferrule 40, cover 42, and/or ferrule portions 40' and 42'.

Instead of providing an aperture in the ferrule 40 for feeding glass solder, such aperture may be provided in the cover 42 instead, or in addition. Further, the cavity 48 may be defined by a pocket provided in only one of the ferrule 40 and the cover 42. Alternatively, instead of wells defining the pockets 44 and 54, grooves of significant larger size may be provided in the cover 42 and/or ferrule 40 bridging the grooves 34 and 35 (i.e., large clearances between optical fibers 24 and the larger grooves to facilitate flow of sealant to hermetically, internally plug the assembly).

While the above embodiments are directed to a hermetic multi-fiber ferrule assembly, the present inventive concept is equally applicable to a hermetic single-fiber ferrule assembly.

Figure 10A:
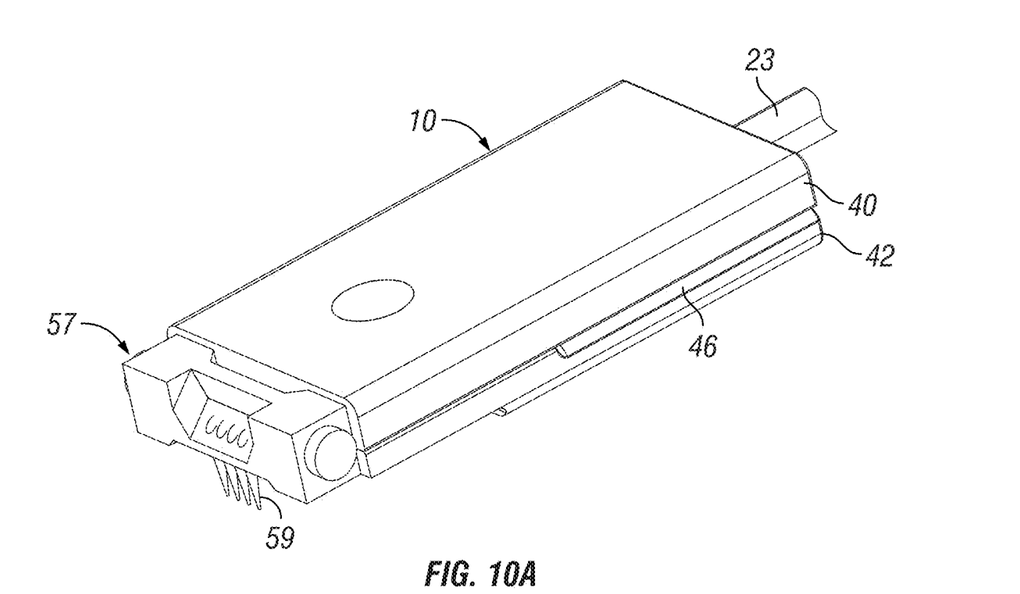
FIGS. 10A and 10B are perspective views of a light directing element at the exit end of the optical fibers in the hermetic optical fiber assembly, in accordance with one embodiment of the present invention.
Figure 10B:
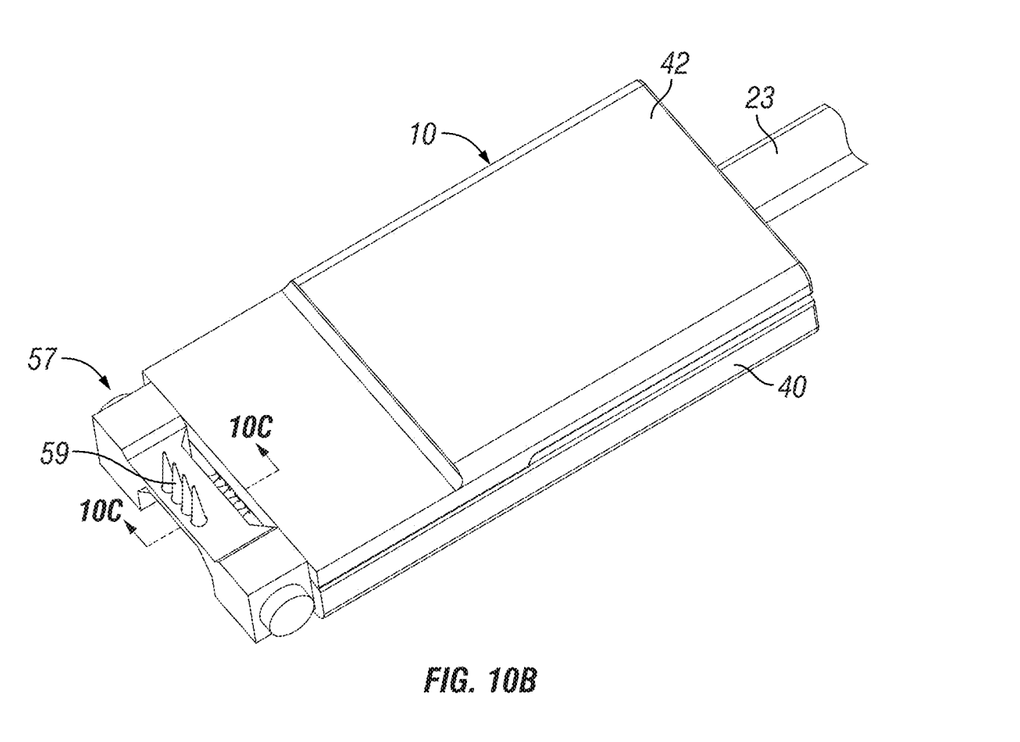

FIGS. 10A and 10B are perspective views of a light directing element at the end of the optical fibers 24 in the hermetic optical fiber assembly 10 discussed above; FIG. 10C is a sectional view taken along line 10C-10C in FIG. 10B. A separate mirror assembly 57 (schematically shown) is positioned and aligned with the ends of the optical fibers 24, to direct light input/output between the fiber ends and an opto-electronic device 58 (schematically shown), such as a transmitter (e.g., a laser such as a VCSEL—Vertical Cavity Surface-Emitting Laser) or a receiver (e.g., photodetector). These opto-electronic devices convert between electrical signals and optical signals, and are contained in the opto-electronic module 12. FIG. 13 is a sectional view showing additional detail of the mounting of the hermetic optical fiber assembly 10 through the openings (21, 22) in the base 16 of opto-electronic module housing 14, in accordance with another embodiment of the present invention.

The mirror assembly 57 may be attached to the assembly 10, and the input/output of the mirror assembly 57 is positioned and aligned with respect to the opto-electronic device 58. Alternatively, the mirror assembly 57 is supported within the module 12 and aligned with respect to the opto-electronic device 58, with the hermetic assembly 10 aligned to the mirror assembly 57. Reference also to FIG. 3, the hermetic assembly 10 is hermetically sealed to the module housing base 16. The hermetic assembly 10 may be deemed to function both as a feedthrough and as an alignment ferrule for the optic fiber ribbon 23.

While the above described embodiments are described in reference to a hermetic ferrule assembly that has a generally rectangular cross-section, other cross-sectional geometry may be implemented without departing from the scope and spirit of the present invention.

Figure 11:
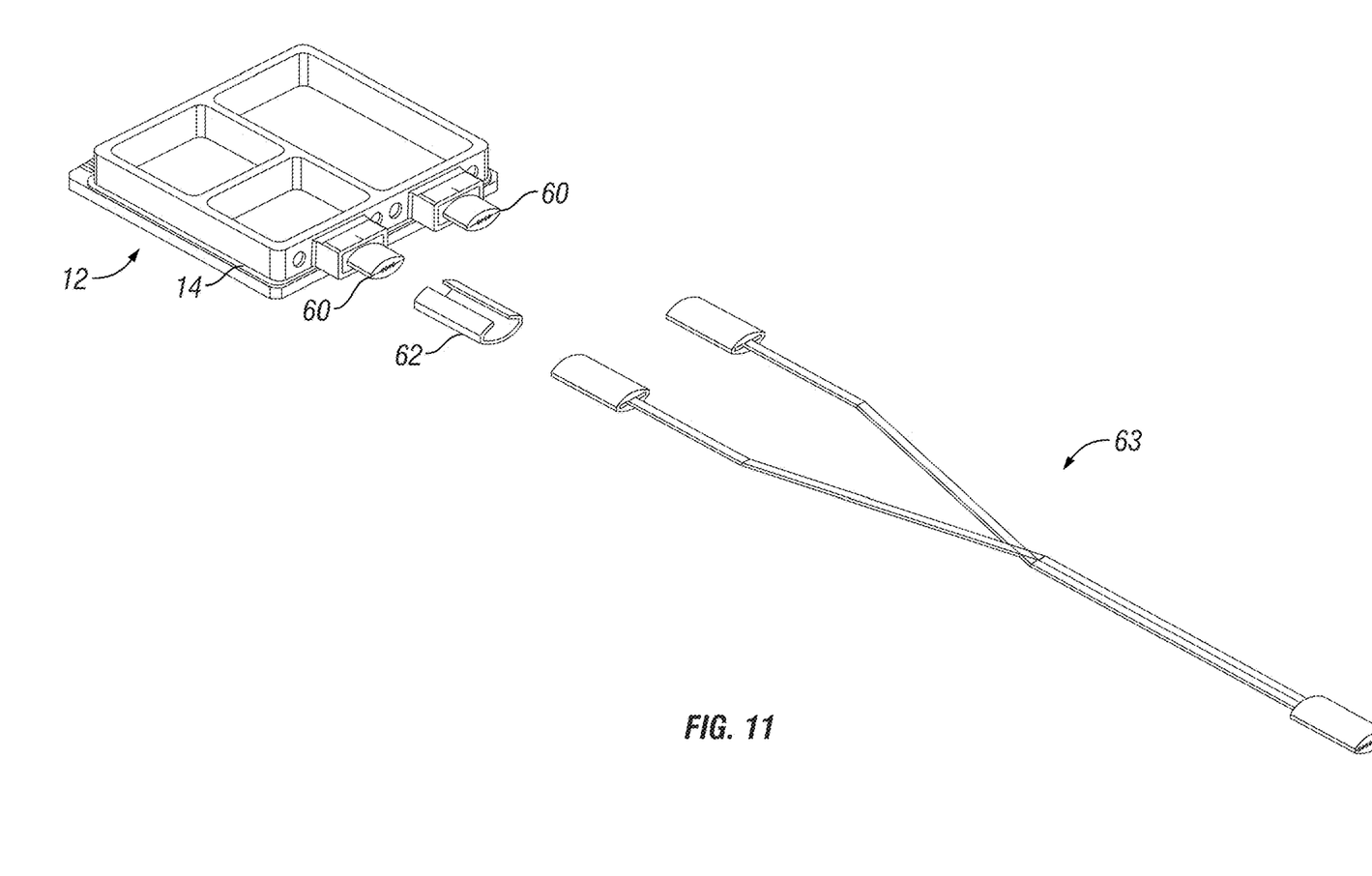
FIG. 11 is a schematic perspective view of an opto-electronic module housing, to which hermetic optical fiber assemblies are hermetically sealed, in accordance with another embodiment of the present invention.
Figure 12:
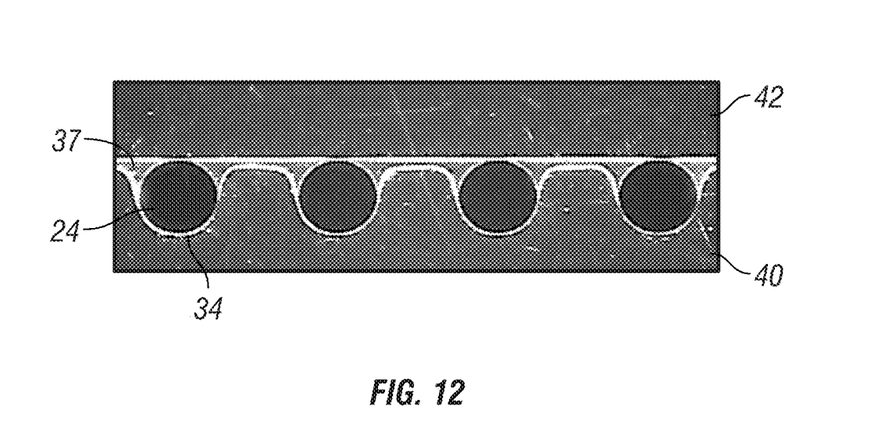
FIG. 12 is a photographic sectional view of a prototype of the hermetic optical fiber assembly.

Referring to embodiment illustrated in FIG. 11, the hermetic ferrule assembly may have a generally oval cross-section. The structure of the hermetic assembly 60 may be similar to the hermetic assembly 10 in the earlier embodiments, except that the external cross-sectional profile is generally oval. The hermetic assembly 60 includes two ferrule portions which together make up the hermetic assembly having the oval cross-section. One of the ferrule portions may correspond to the cover 42 in the prior embodiment (having similar surface features as the underside 38) and the other one of the ferrule portions may correspond the ferrule 40 in the prior embodiment (having similar surface features as the underside 39). In this embodiment, instead of providing the hermetic ferrule assembly connected to a optic fiber ribbon 23 as in the prior embodiments, the hermetic ferrule assembly 60 is hermetically attached to the housing 14 of the opto-electronic module 12, having optical fibers held within the assembly 60 without extending at both ends appreciably beyond the assembly 60 (i.e., the optical fibers held in the assembly 60 terminates substantially coplanar with both end faces of the assembly 60; one of the end faces of the assembly 60 being inside the module housing 14). Alternatively, the oval hermetic assembly in FIG. 11 may be replaced with the hermetic assembly 10 in the prior embodiment, in which case an alignment sleeve having a generally rectangular cross-section would be required.

Accordingly, in this embodiment, the hermetic ferrule assembly 60 provides a demountable terminal for the module 12, for coupling to another optical device, such as an optical fiber ribbon (e.g., a patch cord 63 having similarly shaped ferrules having oval cross-section), by using an alignment sleeve 62 (e.g., a split sleeve having complementary shape sized to receive the ferrule assembly 60 and the ferrule on the patch cord 63). In this embodiment, the hermetic assembly 60 may be deemed to be a hermetic terminal of the module 12 having an alignment ferrule for optical alignment to external devices. With this embodiment, a defective external optical fiber ribbon may be replaced by plugging a replacement fiber ribbon onto the hermetical ferrule terminal.

For the hermetic assemblies described above that are configured for optical alignment/coupling to optical fibers in another fiber ribbon, the external surfaces of the hermetic assemblies should be maintained at high tolerance as well for alignment using an alignment sleeve. In the embodiments described above, no alignment pin is required for alignment of the ferrules. Accordingly, for stamping the ferrule portions (ferrules and covers), that would include stamping the entire body of the ferrule portions, including grooves, mating surfaces of the ferrule portions, and external surfaces that come into contact with sleeves. The sleeves may be precision formed by stamping as well. This maintains the required dimensional relationship between the grooves and external alignment surfaces of the hermetic assemblies, to facilitate alignment using alignment sleeves only without relying on alignment pins.

The hermetic optical fiber alignment assembly in accordance with the present invention overcomes many of the deficiencies of the prior art, which provides precision alignment, high reliability against environmental conditions, and which can be fabricated at low cost. The inventive hermetic assembly may be configured to support a single or multiple fibers, for optical alignment and/or hermetic feedthrough.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. A hermetic optical fiber alignment assembly, comprising:
    a first ferrule portion having a first surface provided with a plurality of grooves receiving at least end sections of a plurality of optical fibers, wherein the grooves define the location and orientation of the end sections with respect to the first ferrule portion;

a second ferrule portion having a second surface facing the first surface of the first ferrule portion, wherein the first ferrule portion is attached to the second ferrule portion with the first surface facing towards the second surface, wherein the end section of each optical fiber terminates substantially coplanar with a first end face of the first ferrule portion and a second end face of the second ferrule portion, wherein a cavity is defined between the first ferrule portion and the second ferrule portion, wherein the cavity is located partially in the first ferrule portion away from and between the first end face and another end face of the first ferrule portion, wherein the cavity is wider than the grooves, and wherein a suspended section of each optical fiber is suspended in the cavity, and wherein the cavity is hermetically sealed with a hermetic sealant.

2. The hermetic optical fiber alignment assembly as in claim 1, wherein the sealant extends around the suspended sections of the optical fibers within the cavity.

3. The hermetic optical fiber alignment assembly as in claim 2, wherein at least the first surface of the first ferrule portion is provided with a well defining a first pocket in the first ferrule portion, wherein the first pocket and the second ferrule portion together define the cavity.

4. The hermetic optical fiber alignment assembly as in claim 3, wherein the second surface of the second ferrule portion is also provided with a well defining a second pocket in the second ferrule portion, wherein the first pocket and the second pocket together define the cavity.

5. The hermetic optical fiber alignment assembly as in claim 1, wherein an aperture is provided in at least one of the first ferrule portion and the second ferrule portion, exposing the cavity, wherein the sealant is fed through the aperture.

6. The hermetic optical fiber alignment assembly as in claim 5, wherein the aperture is sized to be wider than the optical fibers.

7. The hermetic optical fiber alignment assembly as in claim 1, wherein each end section of the optical fibers come into contact with at least the side walls of the corresponding groove at a plurality of contact points, with no sealant between each optical fiber and the corresponding groove.

8. The hermetic optical fiber alignment assembly as in claim 1, wherein the optical fibers do not extend appreciably beyond the first and second ferrule portions.

9. The hermetic optical fiber alignment assembly as in claim 1, wherein at least one of the first ferrule portion and the second ferrule portion is formed by stamping.

10. The hermetic optical fiber alignment assembly as in claim 9, wherein at least one of the first ferrule portion and the second ferrule portion is made of a metal material.

11. An opto-electronic module, comprising:
a housing; and
a hermetic optical fiber alignment assembly as in claim 1, hermetically sealed to the housing.

12. An opto-electronic module, comprising:
a housing; and
a hermetic optical fiber alignment assembly as in claim 1, hermetically sealed to the housing, forming a terminal for external connection.

13. A hermetic optical fiber alignment assembly, comprising:

a first ferrule portion having a first surface provided with at least a groove receiving at least an end section of an optical fiber, wherein the groove defines the location and orientation of the end section with respect to the first ferrule portion;

a second ferrule portion having a second surface facing the first surface of the first ferrule portion, wherein the first ferrule portion is attached to the second ferrule portion with the first surface facing towards the second surface, wherein the end section of the optical fiber terminates substantially coplanar with a first end face of the first ferrule portion and a second end face of the second ferrule portion, wherein a cavity is defined between the first ferrule portion and the second ferrule portion, wherein the cavity is located partially in the first ferrule portion away from and between the first end face and another end face of the first ferrule portion, wherein the cavity has a width wider than the groove, and wherein a suspended section of the optical fiber is suspended in the cavity, and wherein the cavity is hermetically sealed with a hermetic sealant.

14. The hermetic optical fiber alignment assembly as in claim 13, wherein there are a plurality of optical fibers and a plurality of grooves each receiving at least the end section of one of the optical fibers.

* * * * *